United States Patent [19]

Corda et al.

[11] Patent Number: 5,758,122
[45] Date of Patent: May 26, 1998

[54] IMMERSIVE VISUAL PROGRAMMING SYSTEM

[75] Inventors: Albert J. Corda; Michael J. Kuchinski, both of Fredericksburg, Va.

[73] Assignee: The United States of America as represented by the Secretary of the Navy

[21] Appl. No.: 408,985

[22] Filed: Mar. 16, 1995

[51] Int. Cl.⁶ .................... G06F 15/00; G06F 9/45
[52] U.S. Cl. ................. 395/500; 395/705; 395/967; 395/704
[58] Field of Search .................. 395/500, 700, 395/650, 966, 967, 978, 701, 704, 705, 348, 349, 127, 800; 345/156; 128/774

[56] References Cited

U.S. PATENT DOCUMENTS

| | | | |
|---|---|---|---|
| 4,797,694 | 1/1989 | Agostinelli et al. | 346/160 |
| 4,845,633 | 7/1989 | Furtek | 326/38 |
| 4,849,880 | 7/1989 | Bhaskar et al. | 395/703 |
| 5,021,976 | 6/1991 | Wexelblat et al. | 395/356 |
| 5,186,629 | 2/1993 | Roben | 434/114 |
| 5,301,336 | 4/1994 | Kodosky et al. | 395/348 |
| 5,313,575 | 5/1994 | Beethe | 395/356 |
| 5,325,533 | 6/1994 | McInerney et al. | 395/701 |
| 5,429,140 | 7/1995 | Burdea et al. | 128/774 |
| 5,481,740 | 1/1996 | Kodosky | 395/800 |
| 5,481,741 | 1/1996 | McKaskle et al. | 395/800 |
| 5,512,919 | 4/1996 | Araki | 345/156 |
| 5,517,663 | 5/1996 | Kahn | 395/800 |
| 5,519,866 | 5/1996 | Lawrence et al. | 397/710 |
| 5,555,354 | 9/1996 | Strasnick et al. | 395/127 |

*Primary Examiner*—Kevin J. Teska
*Assistant Examiner*—Vuthe Siek
*Attorney, Agent, or Firm*—James B. Bechtel, Esq.

[57] ABSTRACT

A method for programming and executing a computer program in an immersive visual programming environment, i.e., virtual reality environment, includes steps for assembling data objects and algorithmic components selected from a set of prefabricated virtual components to construct the computer program, compiling the computer program, and executing the computer program by initiating sequential flow of data objects through the algorithmic components. According to one aspect of the invention, the compiling step is performed while providing visual and audio clues to a user in response to a determined compiler error; the clues indicate the location and nature of the detected compiler error. Additionally, the executing step permits the flow of data objects and the interaction among the data objects to be visually displayed to the user. An apparatus suitable for performing the program and execution of a computer program in a virtual reality environment is also described.

33 Claims, 17 Drawing Sheets

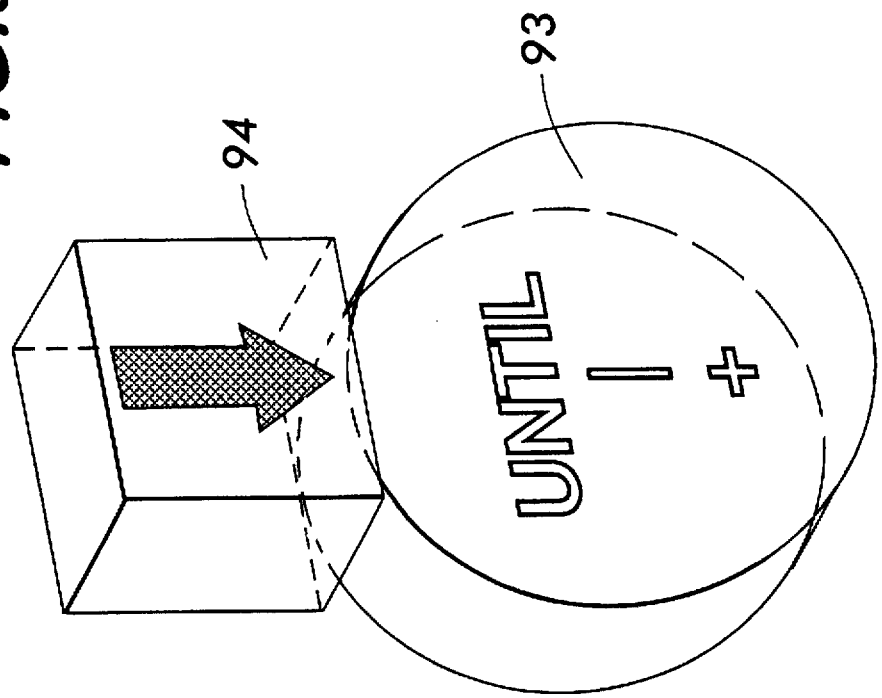
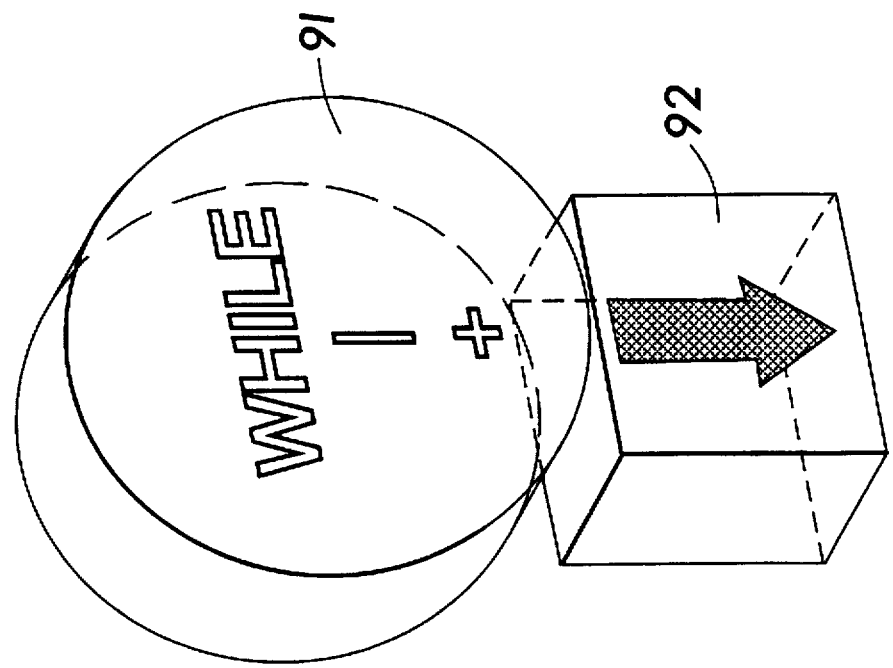
FIG. 9

IMMERSIVE VISUAL PROGRAMMING SYSTEM

BACKGROUND OF THE INVENTION

The present invention generally relates to a virtual programming system, and more particularly, to an immersive visual programming system wherein execution of a virtual program is displayed to a user to illustrate the flow and interaction of data and algorithmic components within the system.

As software complexity continues to increase, our ability to comprehend the architecture and operation of large software systems correspondingly decreases. Accordingly, we have detected a long-felt need in the software industry for providing tools to programmers which further increase their ability to comprehend and synthesize large scale software systems. Some efforts toward fulfilling this need have been recently attempted. One such effort is disclosed in U.S. Pat. No. 5,325,533 entitled *Engineering System For Modeling Computer Programs* issued to McInerney et al. on 28 Jun. 1994. This system provides a human oriented object programming system which provides interactive and dynamic modeling to assist in the development of computer programs. While this invention may be useful in its own right, we believe it can be improved on to provide the programmer with more intuitive clues regarding program assembly, execution and errors.

Another recent attempt is disclosed in U.S. Pat. No. 5,313,575 entitled *Processing Method For An Iconic Programming System* issued to Beethe on 17 May 1994. This invention is based on an iconic programming system which enables a programmer to create programs by connecting various icons into a network representative of the program. Execution of the network is accomplished by processing each icon and performing any programming functions represented by the icon. Again, we recognize potential benefits from this invention, but believe that it can be improved upon to provide the programmer with better feedback regarding program flow and data interaction during execution.

Yet another attempt is disclosed in U.S. Pat. No. 5,301,336 entitled *Graphical Method For Programming A Virtual Instrument* issued to Kodosky et al. on 5 Apr. 1994. Here, a computer programming method is disclosed wherein a graphical interface utilizes data flow diagrams to represent a given procedure. Data flow diagrams are assembled in response to user input utilizing icons which correspond to respective executable functions, scheduling functions, and data types which are interconnected by arcs on the screen. It has been our experience, however, that this type of graphics can be improved to provide better visual information regarding data interaction.

SUMMARY OF THE INVENTION

Accordingly, it is an object of the present invention to provide an improved virtual programming system.

It is another object to provide a virtual programming system that optimally increases a user's, comprehensibility of program structures.

It is still another object to provide a virtual programming system that is useful for defining the high-level flow control and data pathways within a program.

It is yet another object to provide a virtual programming system that allows for dynamic interaction of data objects within a program.

It is still yet another object to provide a virtual programming system that allows a user to define how data objects within the system interact with each other.

These and other objects may be achieved according to the principles of the present invention by providing an immersive visual programming system which enables a programmer to visualize and interact with program elements as though they were physical objects. The objects represent either algorithmic components or data structures. Their size, shape, color and position provide visual clues as to their current state and/or purpose. Programming in the system includes assembling the components into detailed program structures. Many of the components have moving parts, and a completed program is machine-like in appearance. Execution sets the program into motion, and data components flow through it to provide the programmer with an intuitive understanding of program flow and data interaction.

BRIEF DESCRIPTION OF THE DRAWINGS

A more complete appreciation of this invention, and many of the attendant advantages thereof, will be readily apparent as the same becomes better understood by reference to the following detailed description when considered in conjunction with the accompanying drawings in which like reference symbols indicate the same or similar components, wherein:

FIG. 9 illustrates repetitive structures according to the present invention;

DETAILED DESCRIPTION OF THE INVENTION

A program constructed according to the principles of the present invention encompasses both geometric and interactive attributes of its component parts. Object geometry and object interactions complement each other in defining a complete program/construct, just as they do in a real-world machine. The present invention provides both dynamic data/process flow control and object-interactive views of the programs it encompasses via a multi-dimensional approach. The present invention comprises two dimensions, the Flow dimension and the Interaction dimension.

FLOW DIMENSION

The Flow dimension is probably one which the average programmer is able to relate to most easily. In this dimension, a programmer developing software assembles both data and algorithms from elemental, pre-fabricated virtual components. Each algorithmic component has an ingress surface through which it is entered. This typically is at the top of the component. Likewise, each component also has an egress surface through which it can be exited. The egress surface(s) will typically be at the bottom of the component. Labels and/or color coding signify the nature of a surface (i.e. either ingress or egress), and changes in a surface's transparency denotes changes in its permeability, or its ability to allow data to pass through it. Thus, opaque surfaces are impermeable. Translucent ones are only semi-permeable, allowing penetration of certain types of data but not others. Transparent ones are unconditionally permeable. No more than one egress path at a time is permeable, thus insuring that the component has but a single entry and a single exit.

Figure 1:
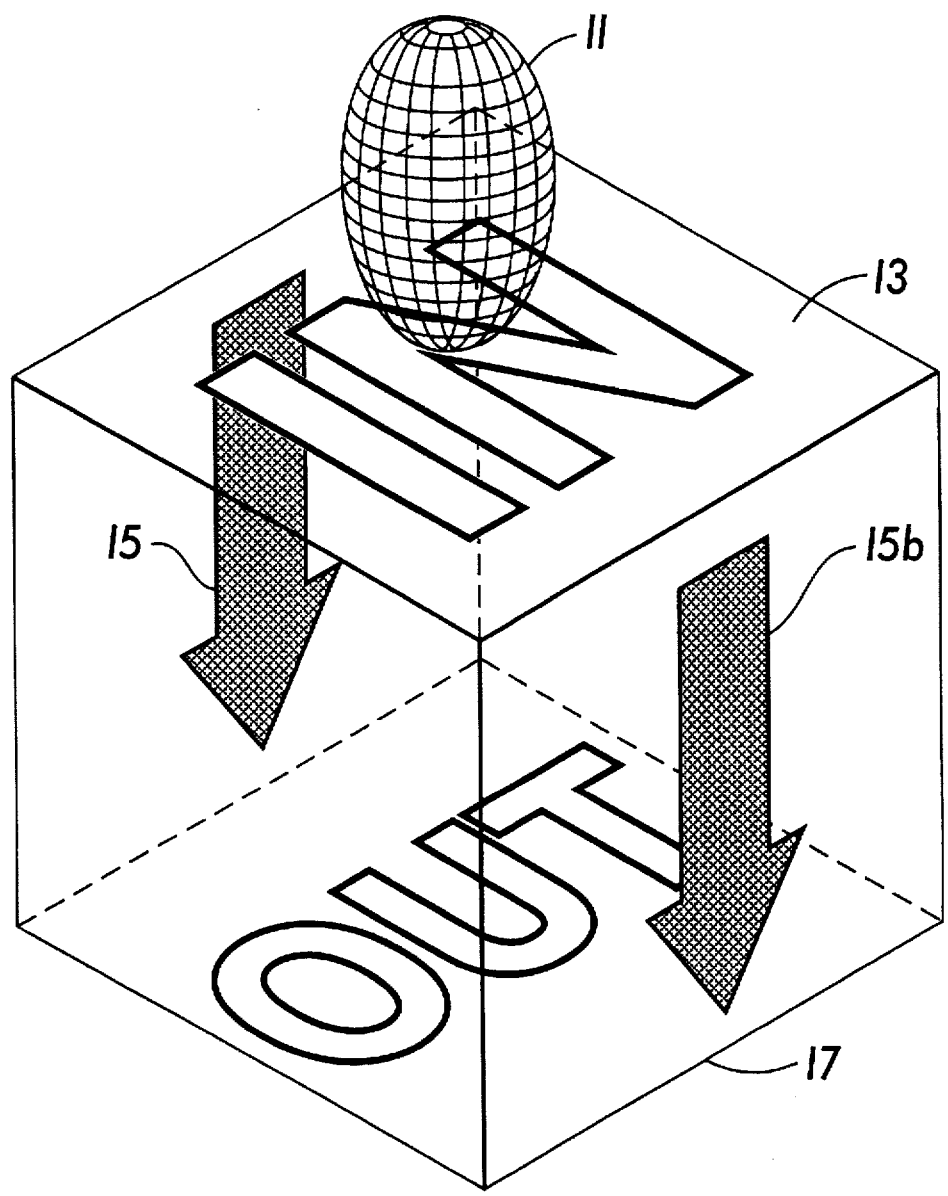
FIG. 1 illustrates how an execution pointer moves through an algorithmic component during execution of a computer program in the present invention.

Program and module structures are assembled from algorithmic components. A thread of execution through a component or structure flows in general from top to bottom, with other movement possible under certain conditions. A visible execution pointer moves through the structure at run time. The location of this execution pointer in the structure will indicate the instruction currently being carried out. FIG. 1 illustrates a basic example of such a component. In FIG. 1, the execution pointer 11, enters the component through ingress surface 13 and exits through egress surface 17. Arrows indicating direction of flow are represented by reference numerals 15a and 15b.

Similarly, data structures are assembled from elemental data components. At any particular instant during execution, the execution pointer contains physical representations of any and all data structures accessible at that particular instant. The pointer therefore always contains global data. Local data exists within the execution pointer only while traversing the structure of the program module with which that local data is associated. Thus, the virtual representations of these local data come into existence only upon entry of the module by the execution pointer. They subsequently disappear once the pointer has exited the module.

Figure 2A:
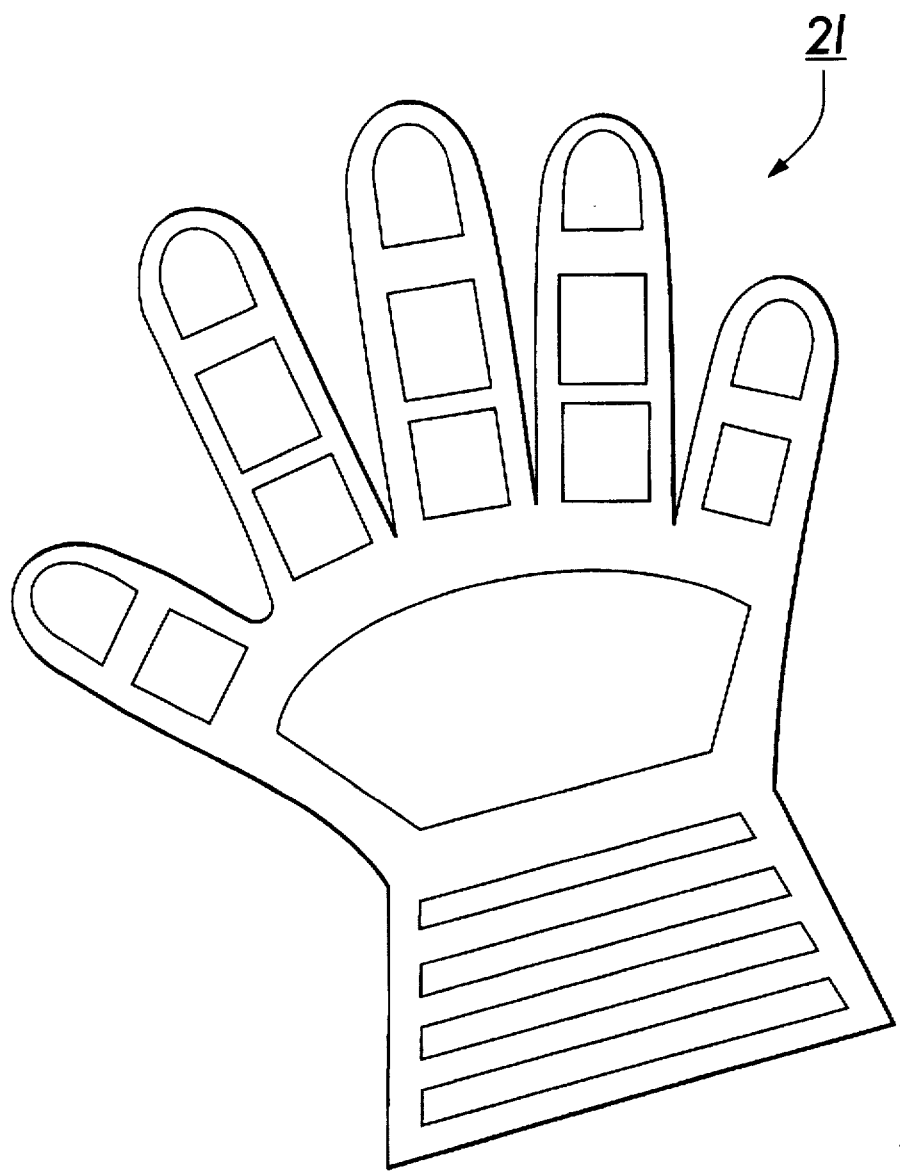
FIG. 2A illustrates a generic example of a data glove used in the present invention.

Within the development environment a programmer is immersed in what is basically a virtual reality ("VR") editor. The programmer is surrounded by the development space and is able to move around, having access to a set of elemental, pre-fabricated components as mentioned before. These are used as program building blocks, and essentially amount to the syntax of the system. Components for the specification of both data structures and functional flow (algorithmic) structures are included. Individual components have physical characteristics that provide clues as to their current state or purpose. The supply of new components is theoretically inexhaustible, and it is possible to make them appear or disappear as needed, through either hand gestures interpreted by a data glove or voice commands. Programming according to the present invention involves grasping these components (by using one or more data gloves) and assembling them into more complex structures by physically placing the components within the programming environment. The data glove(s) can provide tactile feedback depending on the placement of the virtual components. FIG. 2A illustrates a generic example of such a data glove as reference numeral 21.

Figure 2B:
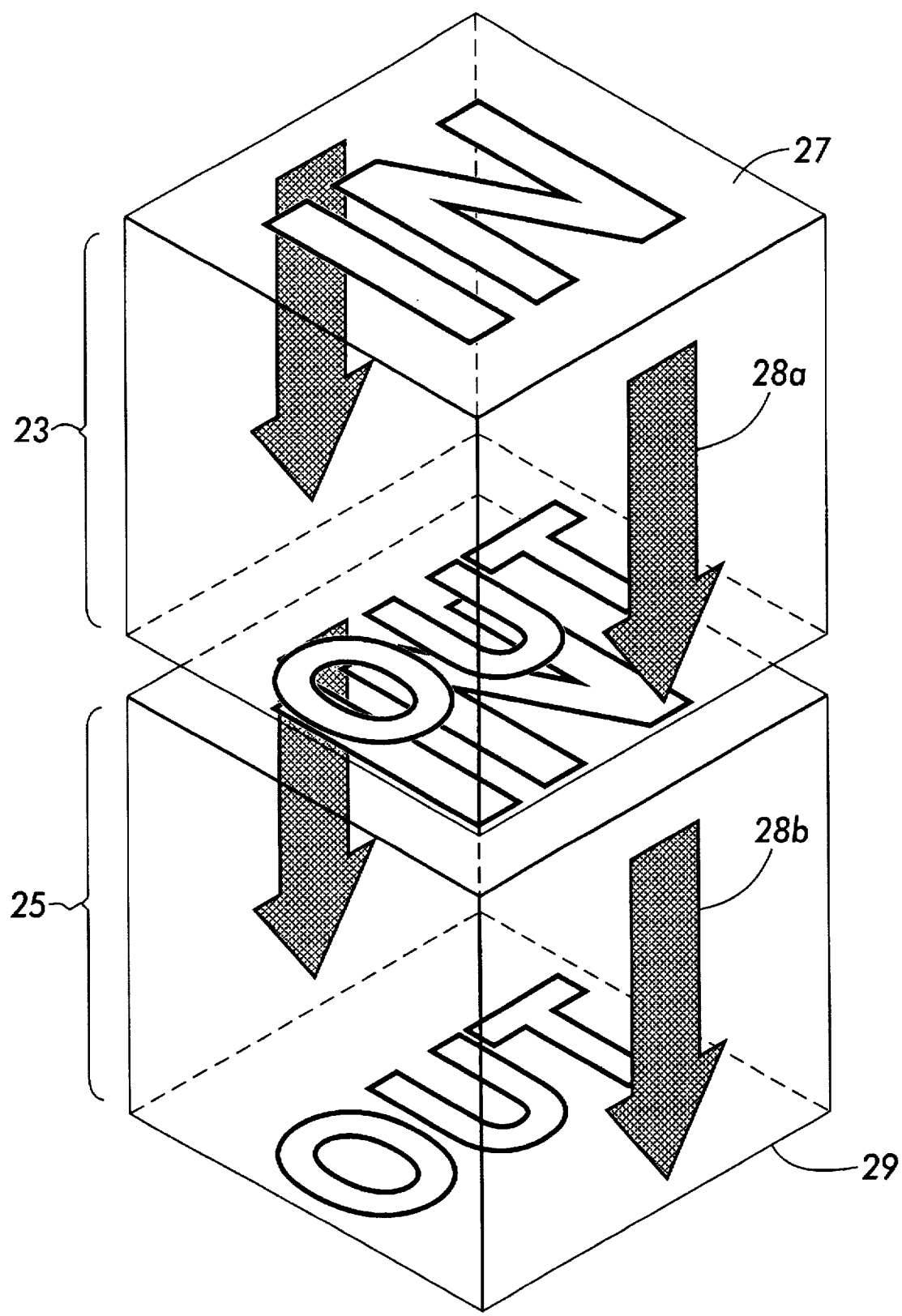
FIG. 2B illustrates two sequential algorithmic components in an assembled state according to the present invention.

Referring to FIG. 2B, two sequential algorithmic components 23 and 25 are illustrated in an assembled state. Data objects enter the sequence through an ingress surface 27 of first algorithmic component 23, and exit the sequence through egress surface 29 of second algorithmic component 25. The components must be assembled such that an egress surface of first algorithmic component 23 is directly above the ingress surface of second algorithmic component 25. Arrows indicating direction of flow are depicted as reference numerals 28a and 28b. Syntax rules are enforced by having the two components behave like magnets. Correct assembly cause the two to attract, and some resistance has to be overcome in order to separate them. Conversely, attempts to assemble two components together incorrectly cause them to repel one another.

It is also possible to nest components and structures. Thus it is possible to build an algorithmic structure to represent a system at any level of detail or specificity. This ranges from the most rudimentary design to a fully implemented, executable system. In this way the environment supports the concept of top-down design and step-wise refinement.

Once the programmer is satisfied that the program as constructed is complete, compilation provides visual and/or audio clues as to the nature and location of compiler errors. Once compiled, execution of the program sets the structure into motion and causes data flow to begin. Movement of data through an assembled structure characterizes the structure's logical flow of control. Moreover, as the structure is set in motion, the environment ceases to be merely an editor and becomes a virtual reality debugger since the flow of data through the algorithmic components of the structure is displayed to the programmer in a visual format. Semantic error detection is enhanced through observation of the flow of data and the motion of the structure itself.

In this way, the virtual programming environment of the present invention supports verification and validation. Run-time error messages in the form of sight and sound alerts are provided, with the offending component highlighted in some way. As for identification of more subtle logic errors, selection of different observation perspectives is also possible. These include different perspectives relative to the system's top-down structure. That is, the environment that surrounds the user variously represents an entire system, or a single thread of execution therein, or a sub-structure such as a module or the body of a loop. The user is able to maneuver around in this environment, changing position and perspective instantaneously if desired, as well as manipulating individual objects or entire structures. Motion is made to go forward or backward at fast or slow speed, or can be made to stop altogether once the system achieves a certain state.

It is also possible to examine data structures and their contents. The development environment described above can arguably be regarded as the ultimate object-oriented programming environment, inasmuch as the program components literally have the physical properties of objects in the real world.

Figure 3:
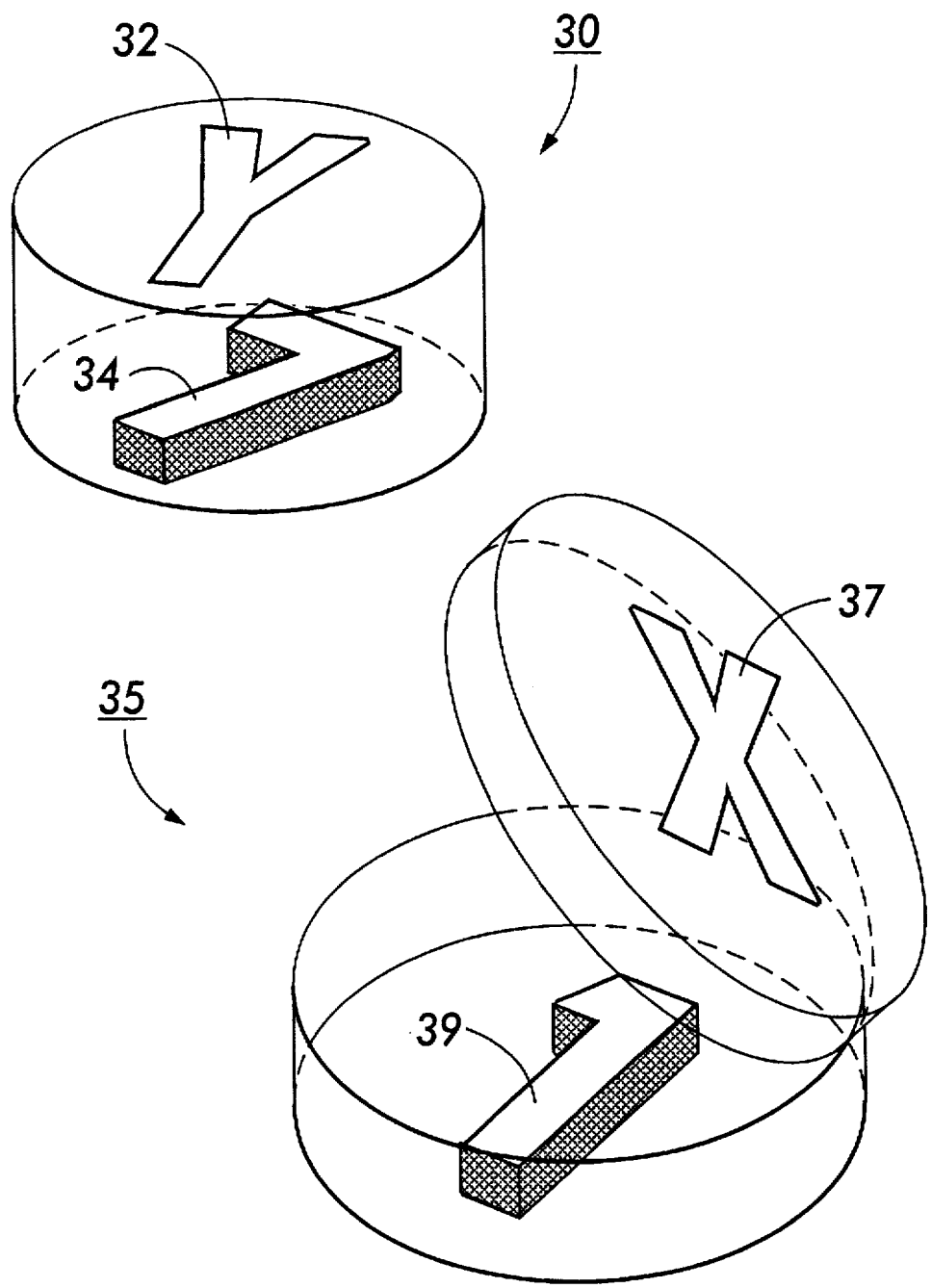
FIG. 3 illustrates data variables and constants according to the present invention.

Data representation in the present invention focuses on two areas. The first is the specification of the data structures themselves, and the second addresses scoping rules. Referring to FIG. 3, the simplest data components, single identifiers, are represented as three-dimensional, cylindrical, disk-like objects. In FIG. 3, disk 30 represents a constant, while disk 35 represents a variable. The identifier's name is specified on the disk's outer surface with its value specified inside. Disk 30 is identified by reference numeral 32 as "Y" having a constant value of "7", as indicated by reference numeral 34. Disk 35 is identified by reference numeral 37 as "X" having a variable value of "1", as indicated by reference numeral 39. Disk 35, which represents a variable, is able to be opened and have its contents changed during execution (as indicated in FIG. 3). Disk 30, however, which represents a constant is not able to be opened, and therefore maintains its constant value. Both object's contents are capable of being copied, however, as when assigning one identifier's value to another, or when writing a value as part of an output stream, or when passing a value as a parameter. Uninitialized variables are therefore empty. Determination of a variable's value at any time during execution is simply a matter of examining the contents of its disk. An identifier's numeric type (integer, real, boolean etc.), is specified by the color of the disk. Furthermore, constants are translucent and variables are transparent. As with other programming languages, more complicated data structures including arrays and records, are fashioned from different arrangements and combinations of these simple components.

Figure 4:
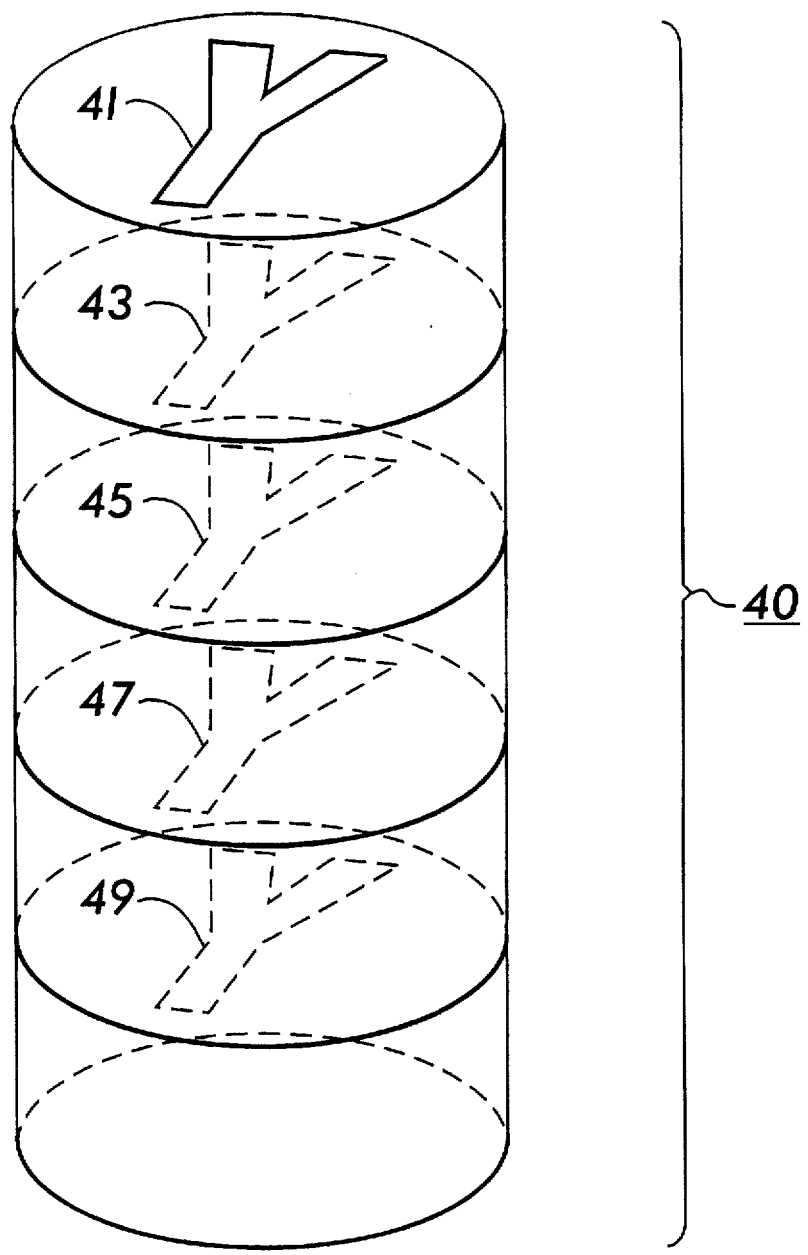
FIG. 4 illustrates a one-dimensional array of data variables according to the present invention.

A single dimensional array is represented as a column of the simple data components described above, a two-dimensional array is represented as rows of these columns, and a three-dimensional array is represented as multiple rows of columns. Referring to FIG. 4, a single dimensional array 40 comprised of individual data components 41, 43, 45, 47 and 49 is depicted. As the elements of an array are homogeneous, each simple data component disk in a given array is of the same color. Records on the other hand are constructed in a manner similar to single-dimensional arrays, but without the constraint that each individual disk be of the same color. With these two building conventions, it is possible to manufacture more complicated structures, nesting and combining them in various ways to create arrays of arrays, arrays of records, and so forth.

It might seem that the physical representations of some of the more complicated data structures will be too large to be contained within the execution pointer described earlier. However it is important to remember that in VR, objects need not conform to the same physical constraints as objects in the real world. Thus a multi-dimensional array according to the present invention need not have a physical representation any larger than that of a single variable. In order for one object to nest within another, either or both of the objects are scaled as required. This is true not only for data structures, but for algorithmic components as well.

Finally, there is the issue of the scope of the data structures. The term scope refers to whether a data item is global or local. The present invention approaches the issue of scoping in a manner similar to that used in other languages, notably C. Data structures are either global throughout a program or local to a single module. In the discussion of ingress and egress surfaces (see above), it was noted that certain of these surfaces have limited permeability. The extent of that limitation is a function of the scope of the data items attempting to penetrate the surface. Thus an egress surface for a module permits the passage of global data items, but inhibit the passage of data items declared local to that module. Parameter arguments to the module that are call-by-value are similarly constrained, while call-by-address arguments are not inhibited upon exit.

The algorithmic components used in the present invention include the three commonly associated with structured programming. These are the sequential, conditional branching and repetitive structures. At the same time, however, single instructions need to have a representation, as they constitute the most fundamental functional building block in any language.

Figure 5:
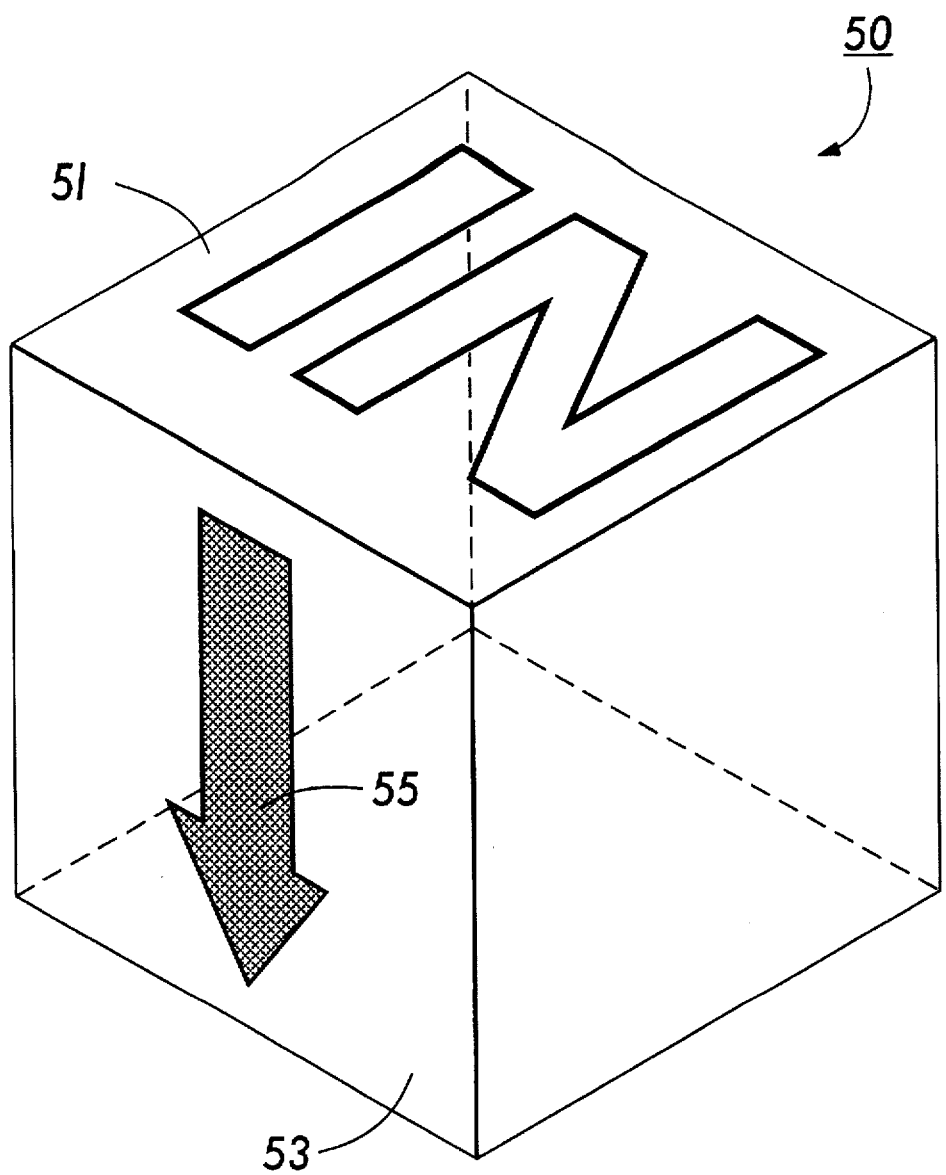
FIG. 5 illustrates a single instruction according to the present invention.

According to the present invention, a single instruction is defined as one of the following: an assignment statement, a read or write statement, or a call to a module. Referring now to FIG. 5, a single instruction is visually represented as a cube 50. Ingress path 51 and egress path 53 are unconditionally permeable. Its lateral surfaces are opaque to signify that it is indivisible and representative of the lowest level of functional detail.

Upon execution, an assignment statement in the present invention behaves as follows. The execution pointer includes the variable or data structure to which the instruction is about to assign a value. This must of necessity be true, since failing to do so would violate the scoping rules of the present invention, producing a compiler error. Upon entering the assignment through its ingress surface, the data structure in question opens, and has its contents visibly changed as a result of the assignment.

Execution of a read statement in the present invention is somewhat similar. Again, the execution pointer has to contain the variable or data structure into which the value is about to be read. Upon the pointer entering the read through its ingress surface, an opening appears on a lateral side of the read instruction cube. This opening represents a window on the input stream, and the value(s) being read flow through this opening. Then, as with the assignment statement above, the data structure opens and has its contents visibly changed as a consequence of the read.

Execution of a write statement in the present invention also causes an opening to appear or a lateral side of the instruction cube. This opening represents a window on the output stream. (It seems logical to have it appear on the lateral surface opposite from that of a read.) The output stream, which includes combinations of literal character stings, literal numeric or boolean values, or values of data structures flow out through this opening.

A call to a module in the present invention causes the execution pointer to change position instantaneously from the single instruction cube in the calling module. It moves to the ingress surface of the sequential structure representing the called module, located elsewhere in the environment. Local data items, including call-by-value parameters at this point appear in the execution pointer, and remain there for the duration of that module's execution. This is true even if a call to another sub-module is made within the body of the first sub-module. (Call-by-address values on the other hand already exist, perhaps under a different name, in the execution pointer). Upon leaving the module (via its egress surface), local data disappears from the execution pointer. The execution pointer again changes position instantaneously back to the single instruction in the calling module, and from there the flow of control of the main program is resumed.

When one sub-module calls another, the local data items from the first sub-module remains in the execution pointer as it moves to the second sub-module. Thus local data items incrementally appear (or disappear) from the pointer as the calls to their corresponding modules, are initiated (or completed). Similarly, recursive calls are visualized by having a duplicate copy of a module appear each time a recursive call is made. Each duplicate exists only for the duration of the corresponding recursive call.

Some form of the sequential structure exists in most programming languages. In Pascal and Ada, there is the "begin-end" structure. Similarly, C has the {} notation. In Lisp, the "progn" function is one of several ways to group together multiple instructions that are to be executed in sequence. In the present invention, a sequential processing structure is represented visually as a cube. It is different from a single instruction in that it is able to contain more elaborate structures. Thus, its lateral surfaces are transparent, signifying the presence of a greater level of detail within. These sequential structures do not have any moving parts (although they may contain sub-structures that do). At run time, the execution pointer simply descends through them from top to bottom. In addition to representing a simple sequence of instructions, these structures are also used to represent the body of a loop, or the body of a decision option in a conditional branching structure.

Figure 6:
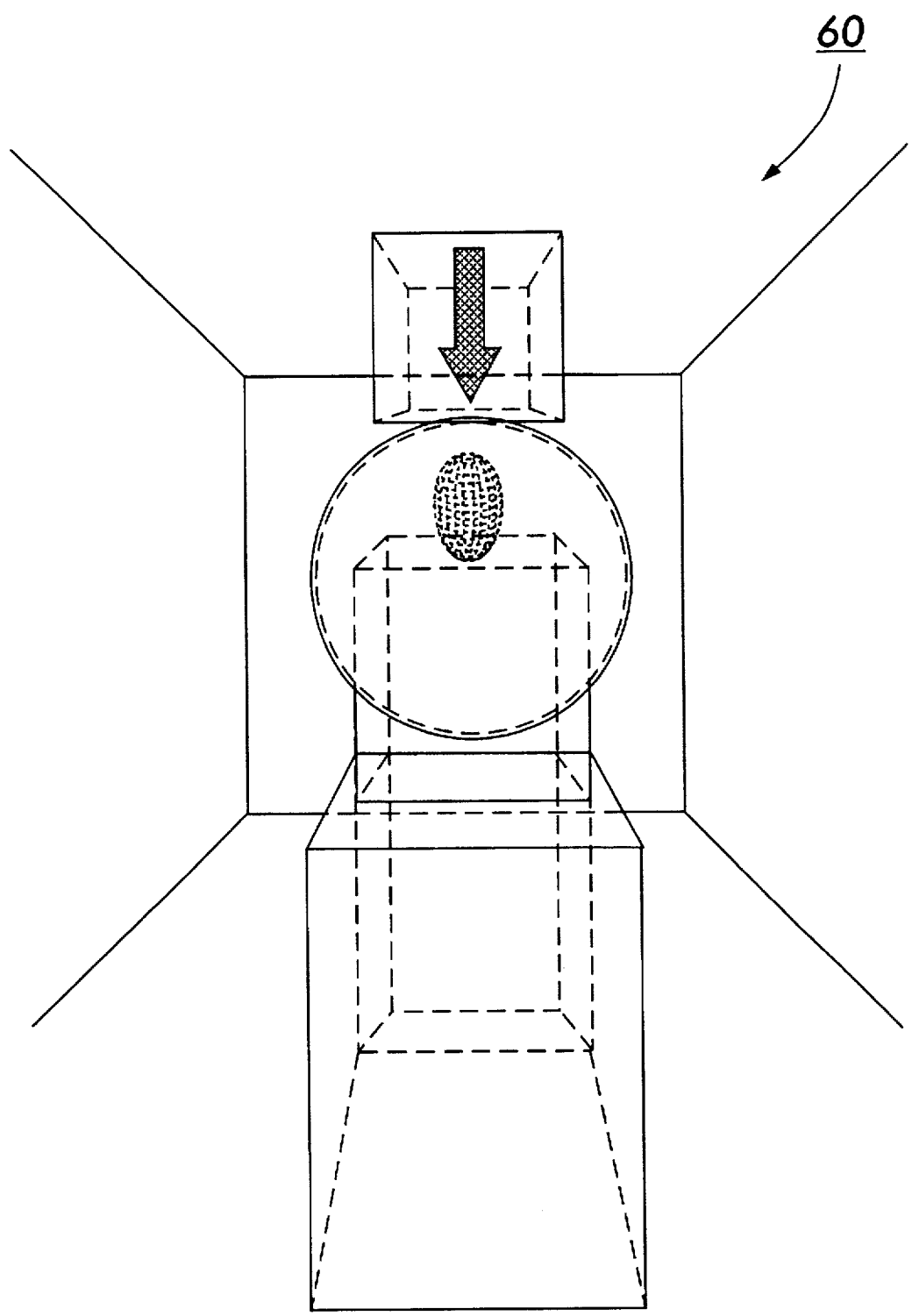
FIG. 6 illustrates a program module structure according to the present invention.

Most programming languages also allow for some type of sub-module. "Functions" and "procedures" in Pascal and Ada, as well as "tasks" in Ada and "functions" in C are examples. The Fortran language has the "subroutine", and Lisp the "defun". Referring to FIG. 6, a sub-module in the form of a sequential structure cube 60 is illustrated. In this role, the sequential structure is isolated from the rest of the program structure, existing by itself in a separate region of the environment. Arguments to these sub-modules are either of the call-by-value or call-by-reference variety, as with "value" and "variable" parameters respectively, in Pascal.

Most programming languages permit conditional branching. One or more conditions are evaluated in turn to determine which execution path should be followed. This path is determined by the first condition that is found to be true. Once a condition is found true, no further conditions are examined. If none of the conditions are true, there is often an "else" option representing a default path to follow. It is worthy of note that every conditional branching structure (even the simplest "if" statement), has an implicit, if not explicit "else" option. It may represent nothing more than otherwise, do nothing or otherwise cause a run-time error, as with "case" statements in standard Pascal. Conditional branching in Ada and Pascal is accomplished, by the "if" structure as well as the "case" structure. Similarly, C has the "if-else" and "switch" notations. The "cond" function of Lisp is only one of several ways in which conditional branching can be done in that language.

Figure 7:
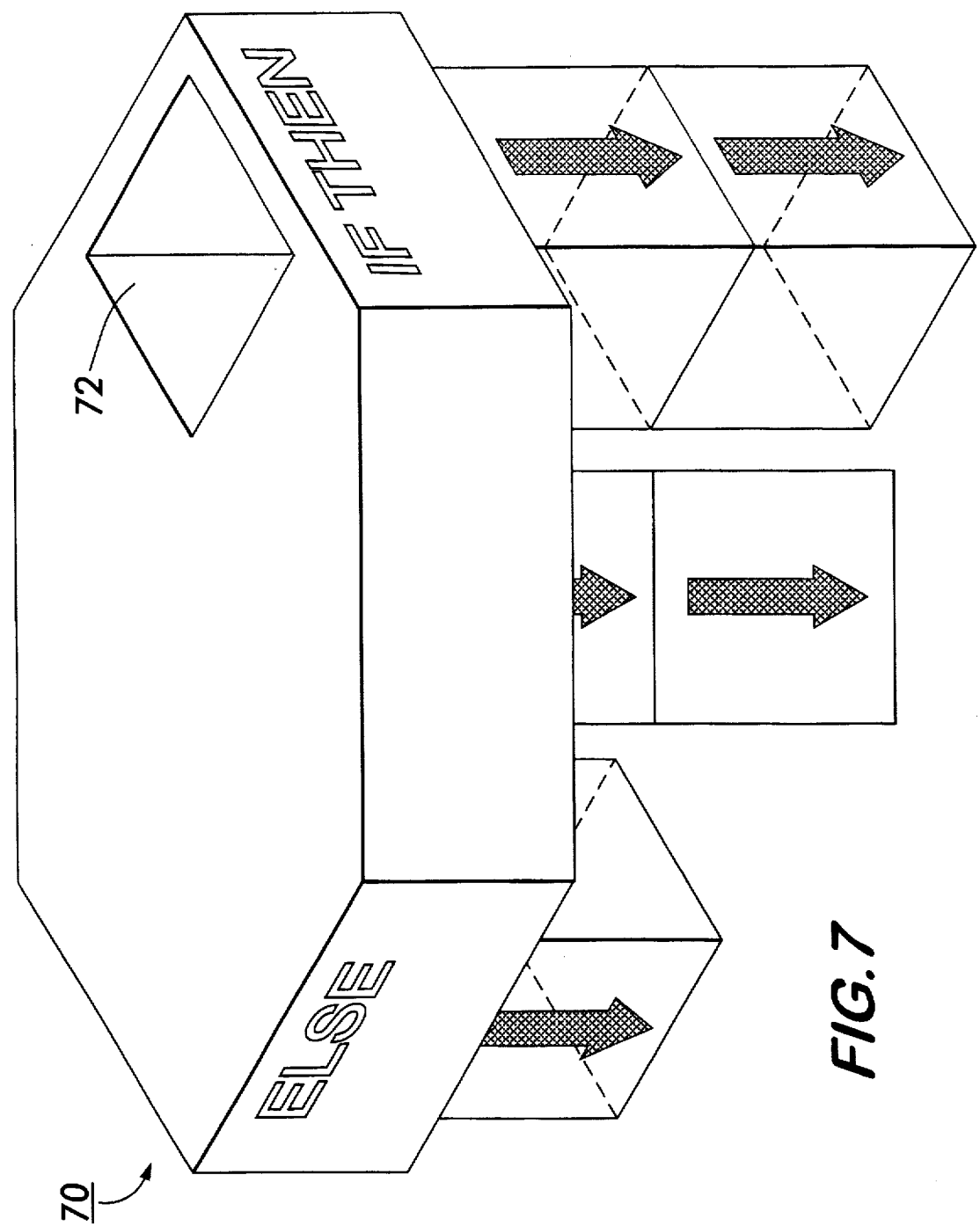
FIG. 7 illustrates a conditional branching structure according to the present invention.
Figure 8:
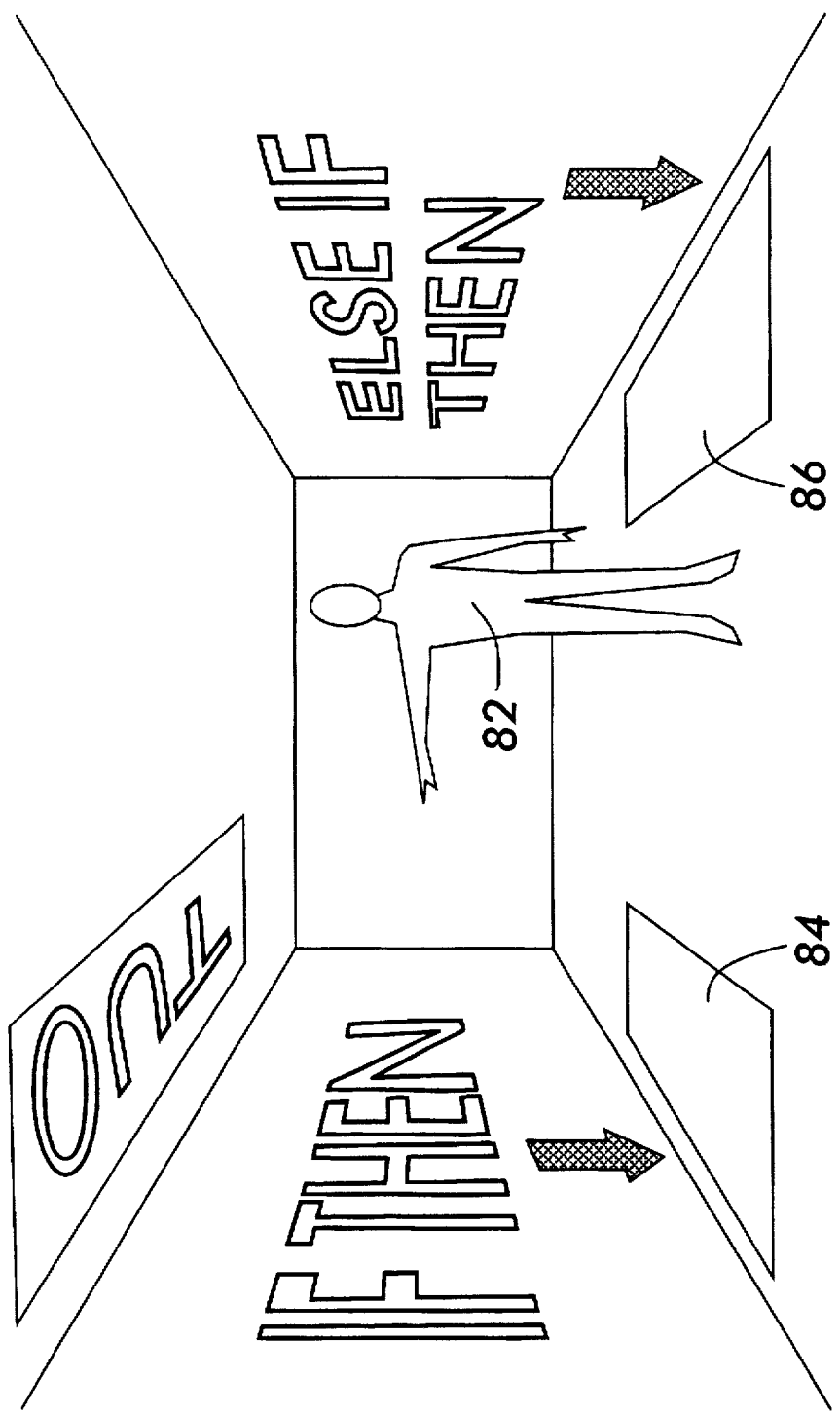
FIG. 8 illustrates the inside of a conditional branching structure during program execution.

Referring to FIG. 7, a conditional branching structure 70 is illustrated. The top surface of structure 70 includes an ingress surface 72 through which data enters. FIG. 8 illustrates the environment within structure 70. A sentinel 82 responsible for monitoring the boolean conditions for each decision option is positioned within structure 70. According to the present invention, all conditional branching structures have an "else" option, even if null. Associated with each decision option are regions of the cylinder's bottom surface. These regions, shown as reference numerals 84 and 86, are designated as egress paths. Their permeability is contingent upon the status of the boolean conditions. Beneath each egress path (except possibly the "else" option) there is a "begin-end" block or a single instruction block which represents the body of that option.

During execution, the execution pointer traverses a conditional branching structure by first entering the cylindrical chamber via the top surface. Ingress path 72 is always permeable. Once within the chamber, each boolean condition is evaluated in turn. As soon as a boolean evaluates true, sentinel 82 points to the corresponding egress path. This causes the entire structure to rotate around the center of the cylindrical chamber, so that the correct egress path and its corresponding body aligns with the program's linear execution path. At this time the egress path also becomes permeable and the execution pointer passes through it. If none of the booleans evaluate to true, sentinel 82 points to the "else" option, and the corresponding egress path aligns with the execution path and becomes permeable. No more than one egress path is ever made permeable on a given pass through the structure. This ensures adherence to the single entry, single exit constraint of structured programming.

Most programming languages allow for both pre- and post-test loops. Generally speaking, in a pre-test loop a boolean condition is evaluated before the loop body is executed. The loop body is then repeatedly executed as long as the boolean condition remains true. By contrast, the body of a post-test loop is always executed once before the loop's boolean condition is tested. The loop body is then repeatedly executed as long an the boolean condition remains false. In Pascal there are the "for" and "while-do" pre-test loop structures and the "repeat-until" post-test loop structure. In Ada there are the "for" and "while" pre-test loop structures. The loop command in Ada combined with the "exit" instruction can be used to create a post-test loop. In C there are the "for" and "while" pre-test loop structure. In Lisp the "do" function can be combined with the "return" function to produce either pre- or post-test loops.

Referring to FIG. 9, syntax for repetitive structures consists of cylindrical chambers 91 and 93, each having a vertical orientation. There also are "begin-end" blocks 92 and 94 which represent the loop's body. The top-most surface of each cylinder 91 and 93 represents the ingress path, and the bottom-most surface represents the egress path. The permeability of blocks 92 and 94 are contingent upon the status of the boolean conditions and the relative positions of cylinders 91 and 93 and blocks 92 and 94, respectively. In a post-test loop, the loop body is initially above the cylinder, as depicted by cylinder 93 and block 94; while in a pre-test loop, the loop body is initially below the cylinder, as depicted by cylinder 91 and block 92.

Figure 10:
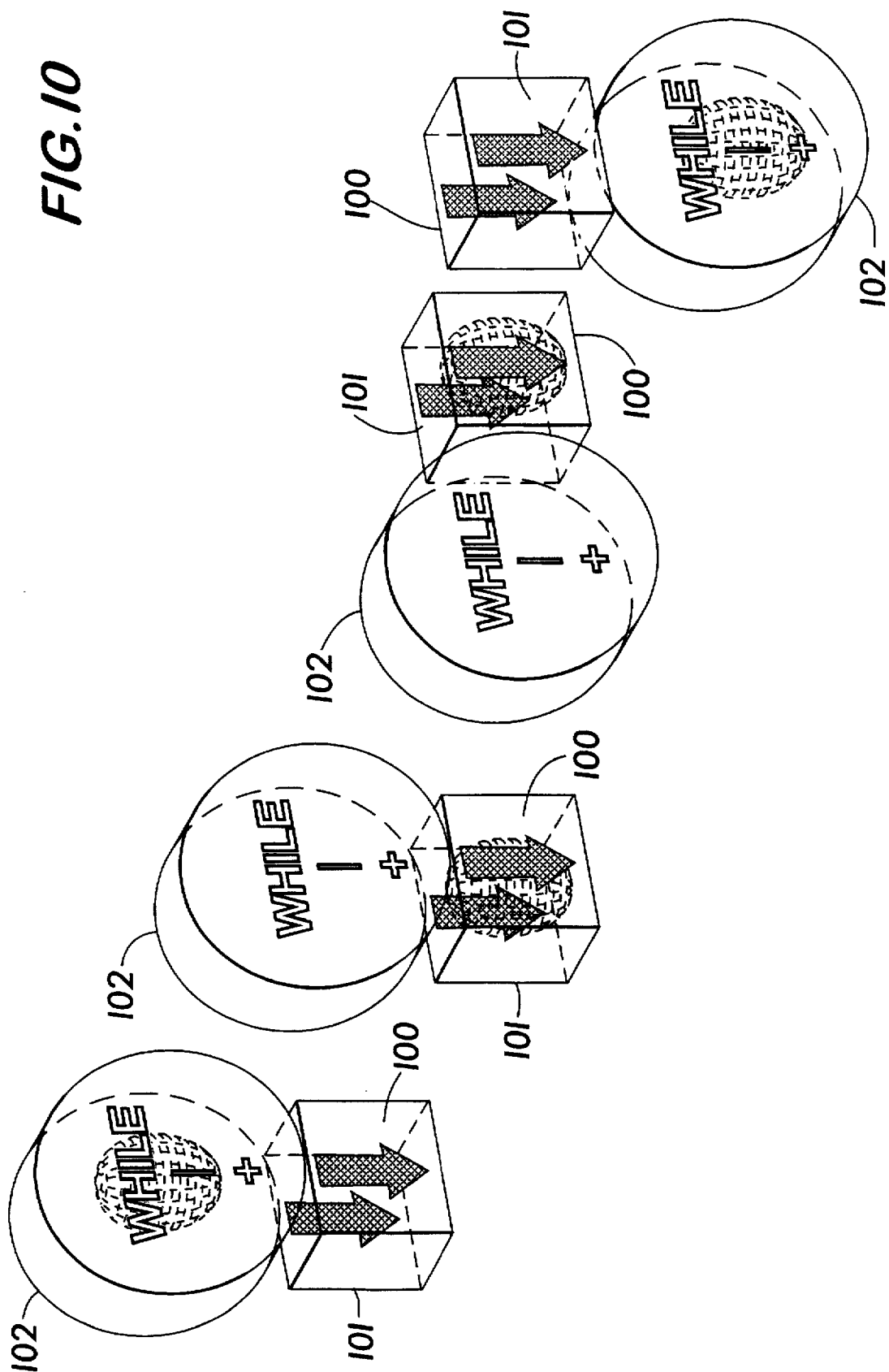
FIG. 10 illustrates stages of a pre-test loop repetitive structure during program execution.

Referring now to FIG. 10, execution of a pre-test loop is depicted. In FIG. 10, a pointer 100 first enters cylinder 102 through the top surface. This ingress path is always be permeable. Once within, the boolean condition is evaluated. Provided the condition is true, the egress path becomes permeable at that time. Pointer 100 then enters block 101, which represents the body loop. While pointer 100 is within block 101, cylinder 102 and block 101 rotate about each other 180 degrees, effectively exchanging places. Thus, upon egress from block 101, pointer 100 once again enters cylinder 102 and the boolean once again is evaluated. If the boolean condition again evaluates to true, block 101 and cylinder 102 undergo a second rotation phase, rotating another 180 degrees. This completes a 360 degree rotation and effectively returns each to its original position. Only then does the cylinder's egress surface become permeable. The cycle repeats itself as long as the boolean condition is true. When the boolean condition finally becomes false, the second phase of the rotation does not take place, but the egress path still becomes permeable. Pointer 100 passes through and rejoins the program's linear thread of execution. This once again ensures a single entry, single exit model.

Figure 11:
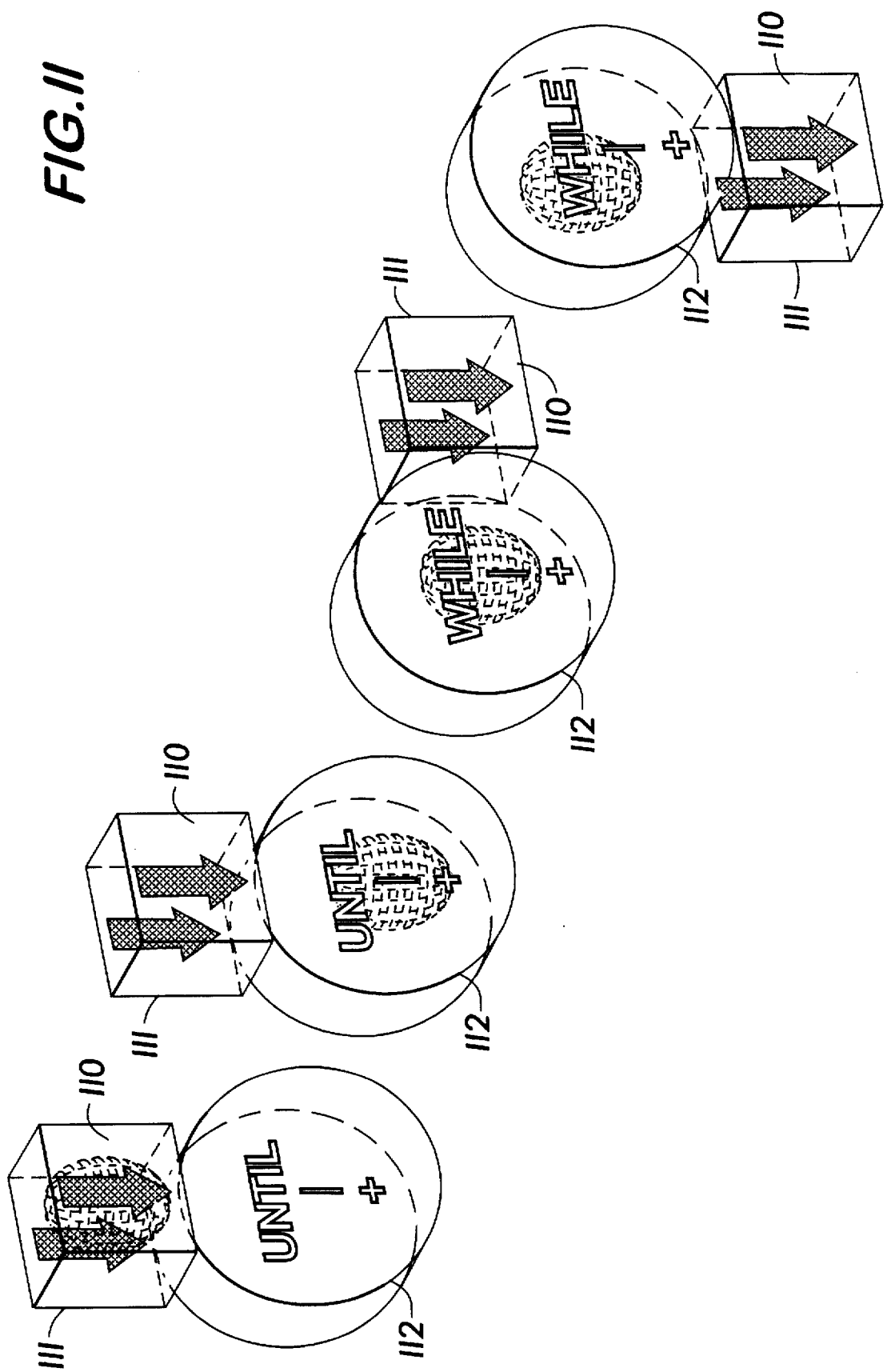
FIG. 11 illustrates stages of a post-test loop repetitive structure during program execution.

Referring now to FIG. 11, execution of a post-test loop is depicted. In FIG. 11, pointer 110 first enters block 111, which represents the loop body, and completes its processing. Then pointer 110 leaves block 111 and enters cylinder 112 through the top (ingress) surface. As before, this ingress path is always permeable. Once within, the boolean condition is evaluated. Provided the condition is false, block 111 and cylinder 112 rotate about each other 180 degrees, so that each exchanges place with the other. Only then does the egress surface become permeable, and pointer 110 again enters block 111. While pointer 110 is within block 111, cylinder 112 and block 111 again rotate another 180 degrees. This completes a 360 degree rotation and effectively returns each to its original position. After completing the loop body again, pointer 110 again enters cylinder 112 and the boolean once again is evaluated. The cycle repeats itself as long as the boolean is false. When the boolean finally becomes true, the second phase of the rotation does not take place, but the egress path still becomes permeable. Pointer 110 then rejoins the program's linear thread of execution.

INTERACTION DIMENSION

The Interaction dimension of the present invention will probably be less familiar to the average programmer than the Flow dimension. Within the Interaction dimension, processes and algorithms are represented via objects and object interactions, and are constrained to obey a specified set of "pseudo-physical" laws. The first step in the Interaction dimension is to define how objects within the virtual environment interact with each other. That is, one must construct a mathematical model or a virtual world of physics to define object interactions within the virtual environment. In order to increase the human comprehensibility of the program structures created, it is important to ensure that the virtual world of physics constructed does not stray too far from the physics of reality as we know it. Since humans operate in a classical "Newtonian" world, and do so in an instinctive and almost reflexive manner, deviating greatly from Newtonian law in a virtual environment might cloud a programmer's understanding more than clarify it. What can be done, however, is to loosen the restrictions and boundary conditions which nature forces upon us, and generalize the model of object interactions in an easily comprehensible way. For instance, it is quite easy for us to picture an object sliding on a frictionless surface, even though such surfaces do not occur naturally. Another example is the perfectly elastic collision. While non-existent in nature, it defines a type of fictional interaction which is nevertheless easy for us to envision.

Figure 12:
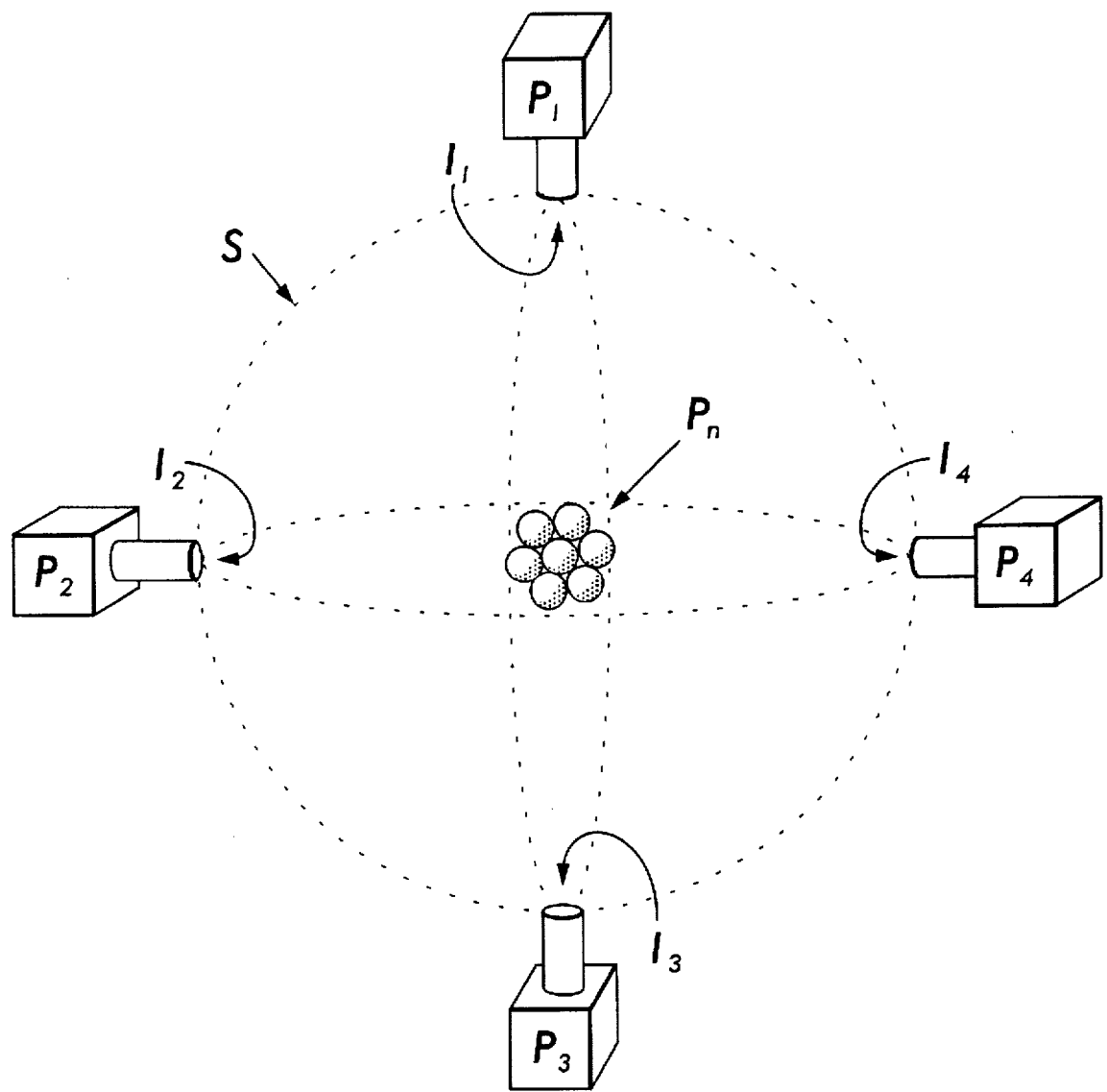
FIG. 12 illustrates an initial state of a process server construct in the present invention.

In order to illustrate how object interactions embody an algorithm, we use a process server "algorithm" within the virtual environment. Referring to FIG. 12, an initial state of the process server construct is illustrated. In FIG. 12, a closed boundary surface or shell, S, encloses a number of process objects, $p_n$. Each process object, $P_n$, is a closed surface which "encapsulates" the program/constructs which make up that particular process. Process server objects, $P_n$, comprise a set of bounded surfaces the union of which constitutes a closed surface, and within which is contained the process server program/construct. Note that each of these process server objects $P_n$ contains a bounded surface $I_n$ which is tangent to the boundary surface S. This "interface surface" is vested with certain attributes which define its interaction with the process objects $P_n$. Similarly, the closed surfaces which encapsulate each of the process objects $p_n$ are also vested with certain attributes which define their interaction with the interface surfaces $I_n$, the boundary surface S, and with each other.

In addition to objects and boundary/interaction surfaces, the present invention also provides "action at a distance" interactions via the creation of pseudo-fields and pseudo-charges. Interaction surfaces can possess a pseudo-charge, the value of which is dependent upon the current state of that object. Moreover, field equations for such interactions are defined specifically for the program/construct being created. We assume a coulomb-like interaction between the process server objects $P_n$ and the process objects $P_n$.

Figure 13:
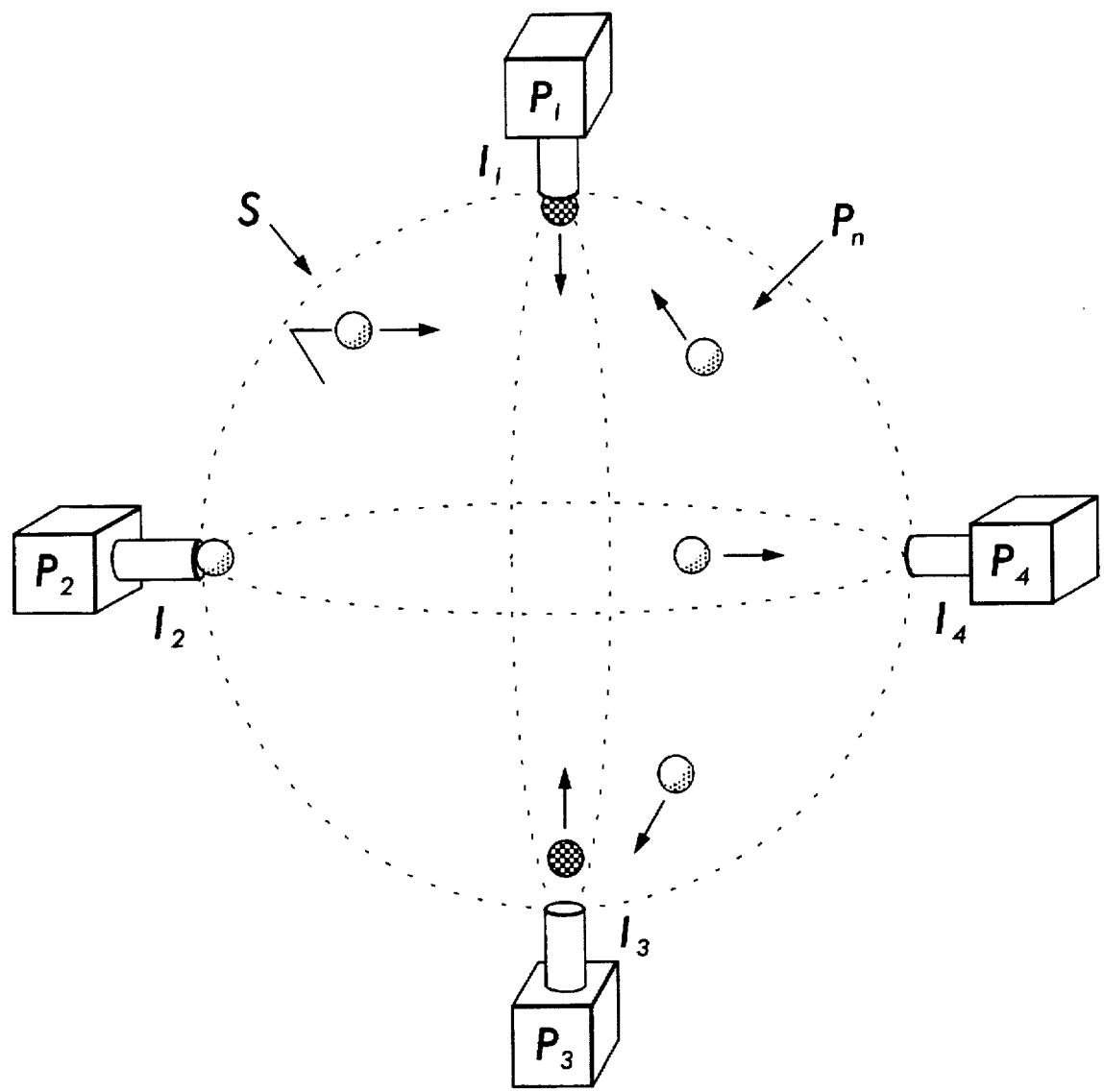
FIG. 13 illustrates process interactions in the present invention.

Referring now to FIG. 13, we see what happens when we let the system evolve in time. Process objects $p_n$ in need of service acquire a pseudo-charge of +1. As a result, they experience a force defined by their interaction with the pseudo-field generated by the combined pseudo-charges of all the other objects in the system. The net reaction is that process objects $p_n$ are attracted to and bind with process server objects $P_n$. When a process object $P_n$ no longer needs service, its state change is reflected by a reversal of its surface pseudo-charge, thus releasing it from its bound state with the respective process server object $P_n$. Upon separation, the process object $p_n$ again changes state, acquiring a neutral pseudo-charge until it is ready for further servicing. It is important to keep in mind that this entire process occurs within a virtual environment. Accordingly, a user is easily able to modify an object's attributes and immediately observe how such changes would affect the operation of the entire system.

Figure 14:
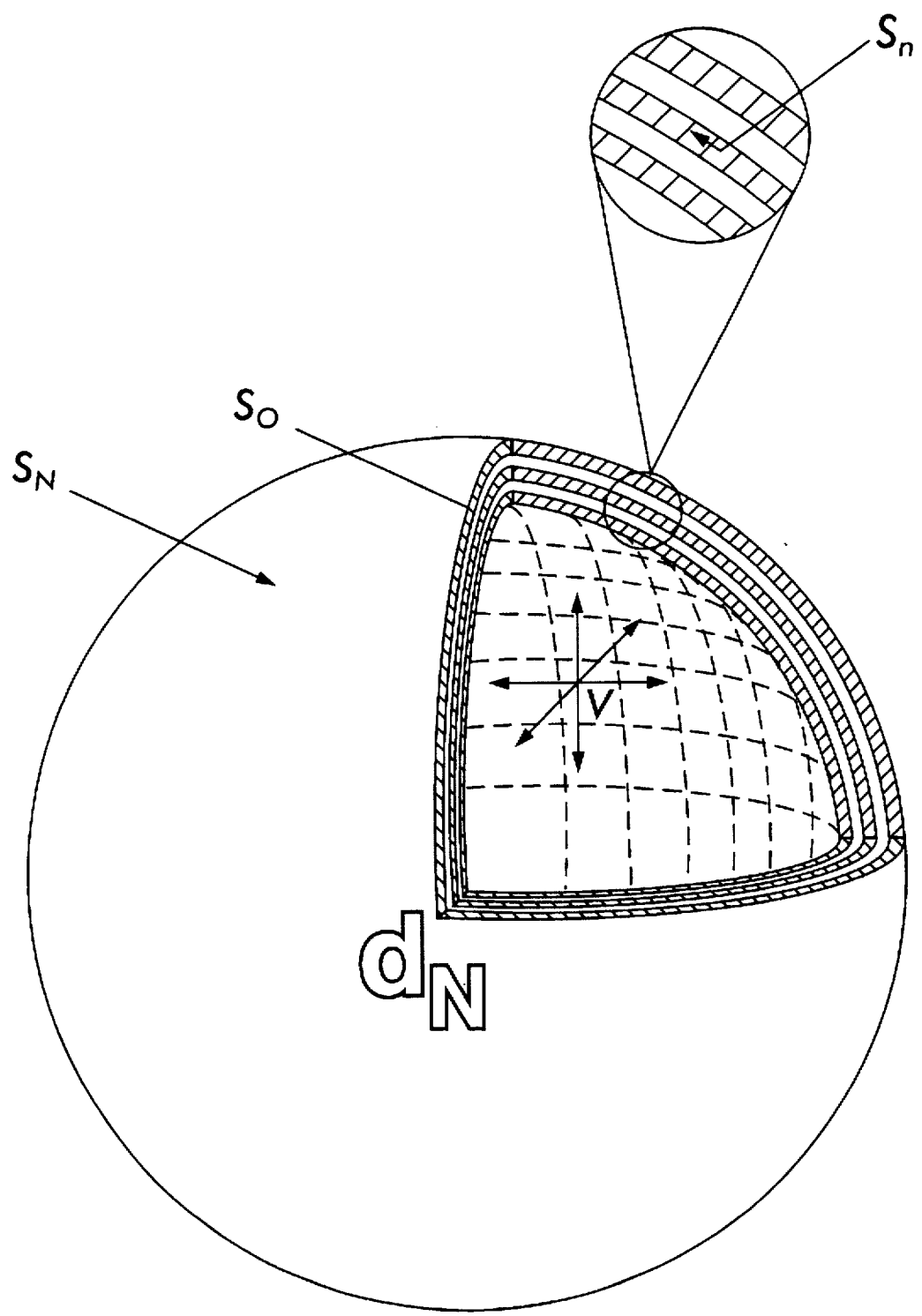
FIG. 14 illustrates data object structure according to the present invention.

In the context of the above discussion, we are defining an "object" to be a closed surface possessing a set of attributes which define the interaction of that surface with other objects, and with the virtual environment in which the object exists. Referring to FIG. 14, an example of a typical object, $d_N$, is illustrated. Note that since the object is a closed or boundary surface $S_N$, it divides its environment into two volumes, an interior (which, for lack of a better term we will refer to as the object's "domain"), and an exterior (which we similarly call the "range"). Also note that this particular object is really a compound object, comprised of a predetermined number of nested boundary surfaces or layers $S_N$. Each boundary surface is in actuality a separate object, $d_N$, completely defined by the attributes of its particular boundary surface. A simple object (comprising a single boundary surface) or a compound object may be encapsulated or unencapsulated when it interacts with the boundary surface of another object, and that interaction allows it to penetrate the boundary surface of that object.

In the present invention, objects may have parameters associated with them that, in essence, represent the value or "purpose" of that object. As an example, consider an object defined by a simple spherical boundary surface. The system user, in creating this object, may assign to it a single integer parameter to hold its "value". Furthermore, he may also assign a surface attribute such as color to be functionally related to the current value of the object's single integer parameter, i. e. a parametric value of 1 may be reflected by the boundary surface assuming the color red. Obviously, since object parameters contain the "meat" of an object, there must be a way to effect changes or perform operations on an object's parameter set. This is accomplished by letting the object interact with other objects sharing the same range. Object interactions are regulated by an object's attribute set. When interaction takes place, the attribute sets of the interacting objects determine the result of the interaction on both the object's attributes and parameters. It is important to note that while all objects are required to have a specified set of attributes and interaction conditions, they may not all possess parameters.

The attributes of the boundary surfaces of an object may be modified by interactions of other objects which take place within the object's domain. Conversely, the attributes of the object's boundary surface completely define its behavior within the object's range. Moreover, the attributes of the boundary surface of an object may be modified by direct interaction with another object's boundary surface (i.e. collisions). All interaction surfaces (of which boundary surfaces are a special subset) possess a number of attributes and interaction conditions which the system user assigns to define how that surface may interact with another surface. These attributes fall into the following categories:

(1) Pseudo-field/Pseudo-charge: refers to a class of attributes and interaction conditions which define action-at-a-distance Coulomb-like (field-effect) interactions with other interaction surfaces, and the resultant Pseudo-forces.

(2) Permeability: refers to a class of attributes and interaction conditions which define the result of a collision between two surfaces (e.g. elastic, inelastic, adhesion, penetration, etc.). Also included in this class are characteristics such as Pseudo-mass, etc.

(3) Penetration: refers to a class of attributes and interaction conditions which determine if, upon penetration, the object will be encapsulated within another object, and if so, what the inherited attributes of that new object's boundary surface will be. Also included in this class are the interactions in which both reflection and transmission of an object may occur. In this case, the object and its "doppelganger" (hereafter referred to as a "doppel") are, in essence still a single object which now co-exists in two or more ranges. Attribute changes which may occur in any one of the doppels are mirrored by identical attribute changes to all the remaining doppels (this class of interaction is analogous to creating multiple pointers to a single data object in a conventional programming system).

(4) Transparency: refers to class of attributes which determine the "transparency" of the boundary surface of an enclosing object. In some cases, it is advantageous to allow certain specified attributes of an enclosed object to be visible outside that object's range. In these cases, the enclosing object's boundary surface takes on the specified attributes of the objects within its domain in a specified manner.

Figure 15:
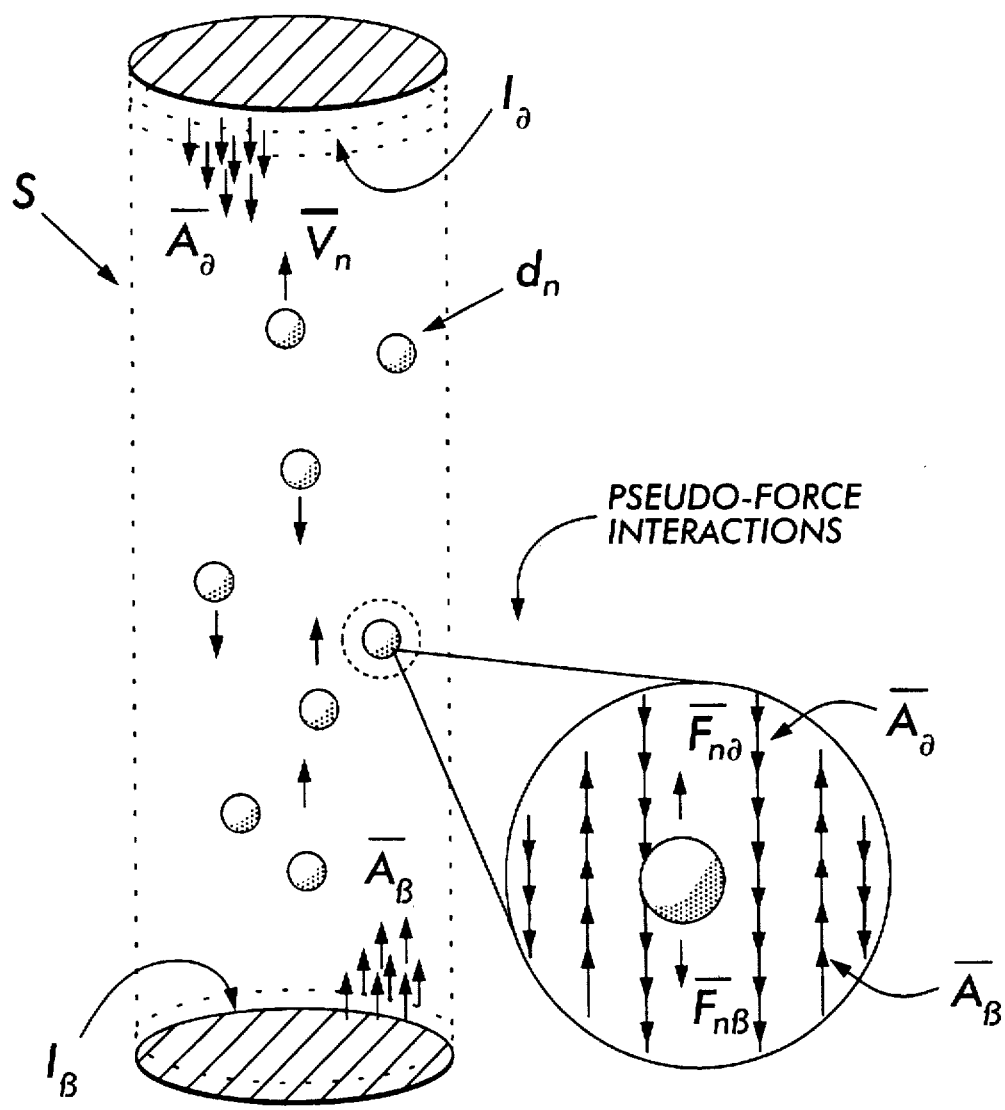
FIG. 15 illustrates a data object sorting construct according to the present invention.

For purposes of example, consider the sorting construct shown in FIG. 15. In this system, each data object $d_N$ has associated with it a pseudo-charge class attribute $d_{n\alpha}$, the value of which is a fully specified function of that data object's set of parameters. It is important to note that $d_{n\alpha}$ can be considered analogous to the "sorting key" used in conventional sorting algorithms. A second pseudo-charge class attribute $d_{n\beta}$ (a constant) is also assigned to each data element. When the system of data objects enclosed by the boundary surface S is subjected to two pseudo-fields $A_\alpha$ and $A_\beta$ (sourced from the interface surfaces $I_\alpha$ and $I_\beta$) each data object will interact with the two fields in such a way as to produce a resultant pseudo-force $F_n$ (comprised of the vector sum of the $\{A_\alpha \cdot d_{n\alpha}\}$ and $\{A_\beta \cdot d_{n\beta}\}$ interactions). This resultant force $F_n$ will induce a velocity $V_n$, resulting in a shift of the data object's position within the cylindrical boundary surface S. The net result of all this will be that data objects will, in essence, sort themselves by "floating" to an equilibrium position ($|F_n|=0$) within the cylindrical boundary surface. The final result is a spatial ordering of data elements with respect to their associated sorting keys. There are, of course, other object attributes relating to damping factors and pseudo-mass which would also be used to smoothly effectuate this process. However, their use and effect are straightforward to those skilled in the art, and their inclusion here may serve only to cloud the key concepts of the present invention.

Figure 16:
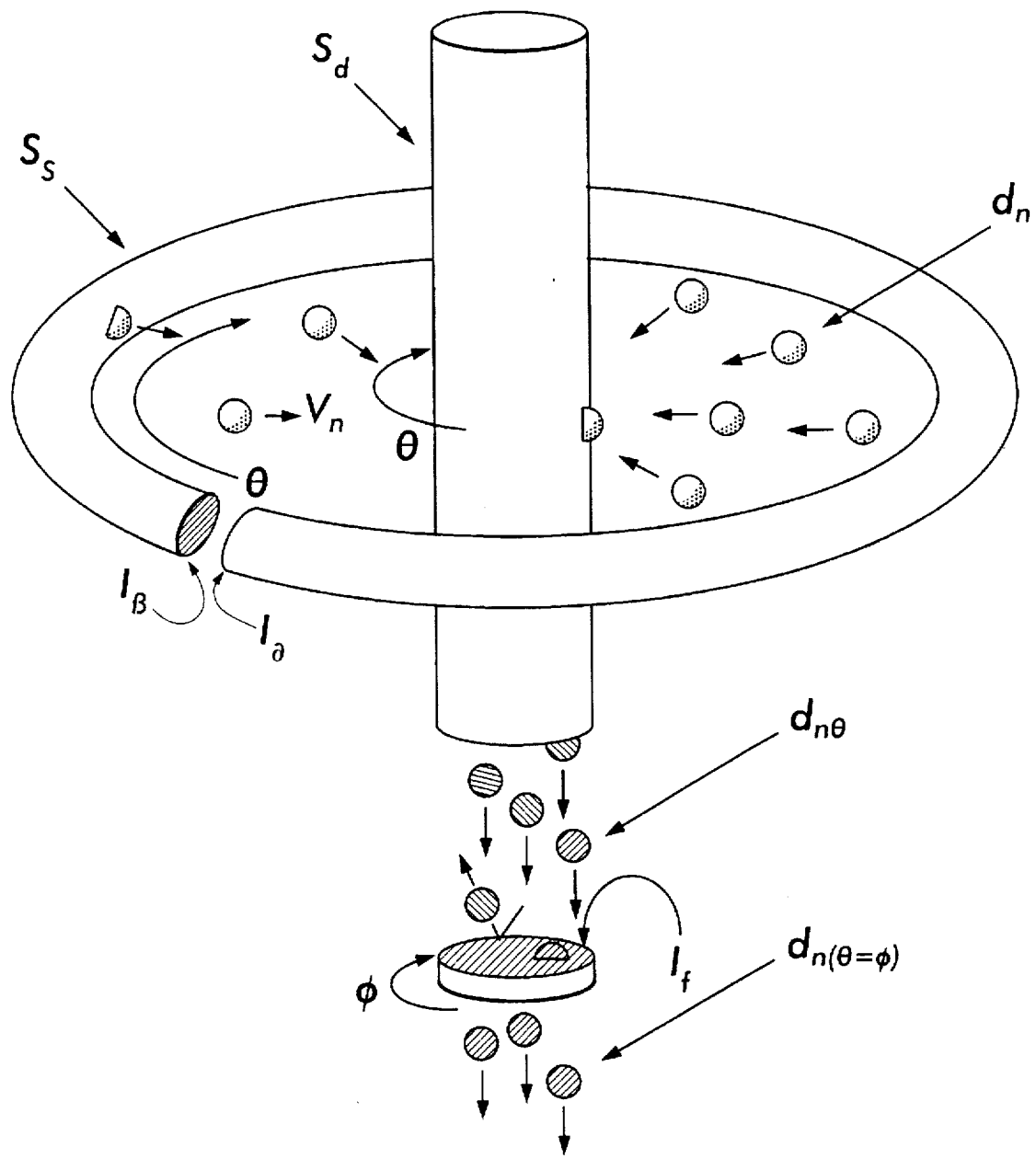
FIG. 16 illustrates another data object sorting construct according to the present invention.

Referring to FIG. 16, we see how the aforementioned sorting construct can be applied to a more complex structure. Here, the previous sorting construct's boundary surface $S_S$ is distorted into a toroidal shape (this distortion, however, is not perceived by the objects within the domain of $S_S$). The boundary surface $S_S$ is also modified in two other ways. It is now allowed to appear "transparent" to a third pseudo-field $A_\lambda$, and it is allowed to become permeable to data objects within its domain that are in critically damped equilibrium ($|V_n|=0$). The central core of the structure in FIG. 16 is an object which interacts with data objects in such a way as to allow each data object to penetrate into its domain. When a data object penetrates the boundary surface $S_d$, it is encapsulated by another boundary surface (in essence, it is encased within another object) which possesses a surface attribute analogous to a polarization $d_{n\theta}$ defined by the angle of entry, $\theta$, into $S_d$. Moreover, the surface $S_d$ possesses a pseudo-field class attribute $A_\lambda$ which allows it to act as the field source which draws sorted data objects (i.e. data objects in equilibrium) out of the domain of $S_S$ and into its own domain (we must, of course, vest the data objects with an additional pseudo-charge class attribute $d_{n\lambda}$ in order to allow an interaction with the externally sourced field $A_\lambda$ to occur).

As this process proceeds, data objects possessing a polarization $d_{n\theta}$ are allowed to accumulate within the domain of $S_d$. Extraction of a sorted data object from the storage object $S_d$ can be accomplished in a number of ways. One approach is to use a pseudo-field to draw the data objects through an interface surface $I_f$ which would only become permeable to data objects matching the interface surface's polarization attribute $\phi$. In this case, data objects so extracted would no longer be accessible to other constructs performing extractions from the same storage object $S_d$, until they were once again returned to the domain of $S_d$. Another approach to data object extraction would be to allow the creation of a "doppel" of the data object matching the interface surface's polarization, rather than actually allowing the data object to leave the storage object's domain. In this case, the same data object would still be available for extraction by other constructs. Using this latter approach, doppels of the matching data object would function in a manner analogous to pointers in a conventional algorithm.

As described above, it is possible to build a program/construct in a VR environment that operates within a multiprocessing architecture. In certain respects, the present invention is analogous to a catalytically aided chemical reaction. That is, the present invention allows for the creation of "catalytic" objects which are associated with processing nodes, further allowing these objects to intermix and interact with data objects within the same domain, wherein attributes of both the catalytic and data objects define what types of interactions are permissible.

The graphic requirements of the present invention, being largely abstract and not requiring photo-realistic detail, are well within the capability of current graphics engines, and accordingly can be created and utilized by those skilled in the art. Likewise, data gloves and six-degree-of-freedom sensing devices are components of most immersive VR systems currently known. Therefore, actual implementation of a programming system constructed according to the principles of the present invention can be achieved through the use of existing components well-known to those skilled in the art.

While there have been illustrated and described what are considered to be preferred embodiments of the present invention, it will be understood by those skilled in the art that various changes and modifications may be made, and equivalents may be substituted for elements thereof without departing from the true scope of the present invention. In addition, many modifications may be made to adapt a particular situation or material to the teaching of the present invention without departing from the central scope thereof. Therefore, it is intended that the present invention not be limited to the particular embodiment disclosed as the best mode contemplated for carrying out the present invention, but that the present invention includes all embodiments falling within the scope of the appended claims.

What is claimed is:

1. A method for programming and executing a computer program in an immersive visual programming environment, said method comprising the steps of:

assembling data objects and algorithmic components selected from a set of pre-fabricated virtual components to construct the computer program;

compiling the computer program while providing visual and audio clues to a user in response to a detected compiler error, said clues indicating a location and nature of the detected compiler error, and executing the computer program by initiating sequential flow of said data objects through said algorithmic components wherein the flow of said data objects and interaction among respective ones of said data objects is visually displayed to the user, wherein a visible execution pointer moves through the assembled algorithmic components during the execution step to indicate an instruction that is currently being performed.

2. The method for programming and executing a computer program as claimed in claim 1, further comprising the steps of providing said visual and audio clues to the user during the execution of the computer program to indicate the nature and location of a detected run-time error.

3. The method for programming and executing a computer program as claimed in claim 1, wherein said data objects each comprise a closed surface possessing a set of user-defined attributes defining the interaction of the respective closed surface with other data objects within the immersive visual programming environment.

4. The method for programming and executing a computer program as claimed in claim 3, wherein said set of attributes of said closed surface is modified in response to the interaction of the respective closed surface with the other data objects within the immersive visual programming environment.

5. The method for programming and executing a computer program as claimed in claim 1, wherein said data objects each comprise a predetermined number of nested boundary surfaces wherein each one of said nested boundary surfaces possesses a set of user-defined attributes defining the interaction of the respective nested boundary surface with other data objects within the immersive visual programming environment.

6. The method for programming and executing a computer program as claimed in claim 5, wherein said set of attributes of each one of said nested boundary surfaces is modified in response to the interaction of the respective nested boundary surface with the other data objects within the immersive visual programming environment.

7. The method for programming and executing a computer program as claimed in claim 1, further comprised of said algorithmic components each having an ingress surface and an egress surface through which said data objects enter and exit, respectively, said ingress surface and said egress surface each exhibiting varying degrees of transparency in dependence upon said data objects' varying ability to pass through each respective surface.

8. The method for programming and executing a computer program as claimed in claim 1, further comprised of said assembling step being performed by grasping and placing said pre-fabricated virtual components within the immersive visual programming environment using a data glove that provides tactile feedback in dependence upon the placement of said pre-fabricated virtual components.

9. The method for programming and executing a computer program as claimed in claim 1, wherein a single identifier data object is represented in the immersive visual programming environment by a three-dimensional, disk-like object having an identifier name on an outer surface and a value within an inner portion.

10. The method for programming and executing a computer program as claimed in claim 9, wherein said single identifier data object representative of a variable quantity is capable of being physically opened by the user during the execution of the computer program to change the value within said inner portion.

11. The method for programming and executing a computer program as claimed in claim 9, wherein each separate numeric type of said single identifier data object is indicated to the user by a separate color.

12. The method for programming and executing a computer program as claimed in claim 1, wherein said algorithmic components comprise a sequential structure visually represented by a cube having transparent lateral surfaces.

13. The method for programming and executing a computer program as claimed in claim 1, wherein said algorithmic components comprise a conditional branching structure visually represented by a cylindrical chamber, said cylindrical chamber being rotatable during the execution step to align with an execution path for passage of said data objects.

14. A method for programming and executing a computer program in an immersive visual programming environment, said method comprising the steps of:

assembling data objects and algorithmic components selected from a set of pre-fabricated virtual components to construct the computer program;

compiling the computer program while providing visual and audio clues to a user in response to a detected compiler error, said clues indicating a location and nature of the detected compiler error;

executing the computer program by initiating sequential flow of said data objects through said algorithmic components wherein said flow of said data objects and interaction among respective ones of said data objects is visually displayed to the user, said flow of said data objects being indicated by a visible execution pointer that moves through said algorithmic components during execution of the computer program to indicate an instruction that is currently being performed; and providing one of said visual and audio clues to the user during the execution of the computer program to indicate a location and nature of a detected run-time error.

15. The method for programming and executing a computer program as claimed in claim 14, wherein said data objects each comprise a closed surface possessing a set of user-defined attributes defining the interaction of the respective closed surface with other data objects within the immersive visual programming environment.

16. The method for programming and executing a computer program as claimed in claim 15, wherein said set of attributes of said closed surface is modified in response to the interaction of the respective closed surface with the other data objects within the immersive visual programming environment.

17. The method for programming and executing a computer program as claimed in claim 14, wherein said data objects each comprise a predetermined number of nested boundary surfaces wherein each one of said nested boundary surfaces possesses a set of user-defined attributes defining the interaction of the respective nested boundary surface with other data objects within the immersive visual programming environment.

18. The method for programming and executing a computer program as claimed in claim 17, wherein said set of attributes of each one of said nested boundary surfaces is modified in response to the interaction of the respective nested boundary surface with the other data objects within the immersive visual programming environment.

19. The method for programming and executing a computer program as claimed in claim 14, further comprised of said algorithmic components each having an ingress surface and an egress surface through which said data objects enter and exit, respectively, said ingress surface and said egress surface each exhibiting varying degrees of transparency in dependence upon said data objects' varying ability to pass through each respective surface.

20. The method for programming and executing a computer program as claimed in claim 19, further comprised of said egress surface of a first one of said algorithmic components exhibiting a magnetic-like attraction towards said ingress surface of a second one of said algorithmic components during the assembly step to indicate proper syntax.

21. The method for programming and executing a computer program as claimed in claim 19, further comprised of said egress surface of a first one of said algorithmic components exhibiting a repulsion towards said ingress surface of a second one of said algorithmic components during the assembly step to indicate improper syntax.

22. The method for programming and executing a computer program as claimed in claim 14, further comprised of said assembling step being performed by grasping and placing said pre-fabricated virtual components within the immersive visual programming environment using a data glove.

23. The method for programming and executing a computer program as claimed in claim 14, wherein a single identifier data object is represented in the immersive visual programming environment by a three-dimensional, disk-like object having an identifier name on an outer surface and a value within an inner portion.

24. The method for programming and executing a computer program as claimed in claim 23, wherein said single identifier data object representative of a variable quantity is capable of being physically opened by the user during the execution of the computer program to change the value within said inner portion.

25. The method for programming and executing a computer program as claimed in claim 23, wherein each separate numeric type of said single identifier data object is indicated to the user by a separate color.

26. A method for programming and executing a computer program in an immersive visual programming environment, said method comprising the steps of:

assembling data objects and algorithmic components selected from a set of pre-fabricated virtual components to construct the computer program, said data objects each comprising a closed surface possessing a set of user-defined attributes defining interactions of the respective closed surface with other data objects within the immersive visual programming environment, said assembling step being performed by grasping and placing said pre-fabricated virtual components within the immersive visual programming environment using a data glove that provides tactile feedback in dependence upon the placement of said pre-fabricated virtual components;

compiling the computer program while providing one of visual and audio clues to the user in response to a detected compiler error, said clues indicating a location and nature of the detected compiler error;

executing the computer program by initiating sequential flow of said data objects through said algorithmic components wherein said flow of said data objects and interaction among respective ones of said data objects is visually displayed to the user, said flow of said data objects being indicated by a visible execution pointer that moves through said algorithmic components to indicate an instruction that is currently being performed; and providing one of said visual and audio clues to the user during the execution of the computer program to indicate a location and nature of a detected run-time error.

27. The method for programming and executing a computer program as claimed in claim 26, wherein said set of attributes of said closed surface is modified in response to the interaction of the respective closed surface with the other data objects within the immersive visual programming environment.

28. The method for programming and executing a computer program as claimed in claim 26, wherein said data objects each further comprise a predetermined number of nested boundary surfaces wherein each one of said nested boundary surfaces possesses a set of user-defined attributes defining the interaction of the respective nested boundary surface with other data objects within the immersive visual programming environment.

29. The method for programming and executing a computer program as claimed in claim 26, wherein said set of attributes of each one of said nested boundary surfaces is modified in response to the interaction of the respective nested boundary surface with the other data objects within the immersive visual programming environment.

30. The method for programming and executing a computer program as claimed in claim 26, further comprised of said algorithmic components each having an ingress surface and an egress surface through which said data objects enter and exit, respectively, said ingress surface and said egress surface each exhibiting varying degrees of transparency in dependence upon said data objects' varying ability to pass through each respective surface.

31. The method for programming and executing a computer program as claimed in claim 30, further comprised of said egress surface of a first one of said algorithmic components exhibiting a magnetic-like attraction towards said ingress surface of a second one of said algorithmic components during the assembly step to indicate proper syntax.

32. The method for programming and executing a computer program as claimed in claim 30, further comprised of said egress surface of a first one of said algorithmic components exhibiting a repulsion towards said ingress surface of a second one of said algorithmic components during the assembly step to indicate improper syntax.

33. A computer programming system for creating and executing a computer program in an immersive visual programming environment, said system comprising:

means for assembling data objects and algorithmic components selected from a set of pre-fabricated virtual components to construct the computer program, said data objects each comprising a closed surface possessing a set of user-defined attributes defining interactions of the respective closed surface with other data objects within the immersive visual programming environment, said pre-fabricated virtual components being grasped and placed within the immersive visual programming environment using a data glove that provides tactile feedback in dependence upon the placement of said pre-fabricated virtual components;

means for compiling the computer program while providing one of visual and audio clues to the user in response to a detected compiler error, said clues indicating a location and nature of the detected compiler error;

means for executing the computer program by initiating sequential flow of said data objects through said algorithmic components wherein said flow of said data objects and interaction among respective ones of said data objects is visually displayed to the user, said flow of said data objects being indicated by a visible execution pointer that moves through said algorithmic components to indicate an instruction that is currently being performed; and means for providing one of said visual and audio clues to the user during the execution of the computer program to indicate a location and nature of a detected run-time error.

* * * * *